United States Patent [19]
Johnson

[11] 3,934,801
[45] Jan. 27, 1976

[54] FISHING ROD HOLDER
[76] Inventor: Raymond A. Johnson, 233 Center St., Manchester, Conn. 06040
[22] Filed: Oct. 15, 1974
[21] Appl. No.: 514,666

[52] U.S. Cl. ................................. 248/41; 248/42
[51] Int. Cl.² .................................... A01K 97/10
[58] Field of Search ........... 248/40, 41, 42; 43/21.2

[56] References Cited
UNITED STATES PATENTS
2,481,118  9/1949  Johns ................................. 248/42
2,484,427  10/1949  Schwenk ........................... 248/42

FOREIGN PATENTS OR APPLICATIONS
1,149,088  7/1957  France ............................. 43/21.2

Primary Examiner—William H. Schultz

[57] ABSTRACT

A fishing rod holder having a pair of spacially displaced rod supporting yokes. One yoke has a pair of relatively fixed jaws and the other yoke has a pair of relatively movable jaws. The fixed jaws are mounted on a lever which acts to close the movable jaws about the rod when the rod is in the position to be held. The holder also has a pair of pivot points which enable adjustment of the position of the fishing rod in two mutually perpendicular directions.

8 Claims, 3 Drawing Figures

FISHING ROD HOLDER

BACKGROUND OF THE INVENTION:

1. Field of the Invention

This invention relates to the supporting of fishing rods during angling. More particularly, the present invention is directed to holding devices for fishing rods whereby a fishing rod can be held for purposes of trolling or to free the fisherman to do other chores or relax while the rod is set and poised to catch a fish. Accordingly, the general objects of the present invention are to provide novel and improved methods and apparatus of such character.

2. Description of the Prior Art

Fishing rod holders of various types are known in the art, including in the patent literature and elsewhere. However, these devices of the prior art have typically suffered from one or more defects. In particular, previous rod holders have often been relatively complicated making it both awkward and difficult to set a fishing rod in the holder; and, more importantly, making it a difficult accomplishment to remove the rod from the holder when a fish is hooked. It is particularly important that removal of fishing rod from the holder be easily, quickly and conveniently accomplished when a fish is hooked. Prior art devices have also encountered problems in adequately retaining the fishing rod in the holder when forces are imposed on the fishing rod, either from a fish being hooked or from other drag forces on the line. In addition, some of the prior art devices do not have adequate degrees of freedom of motion and thus can not be adjusted to desired positions.

SUMMARY OF THE INVENTION:

The above-discussed problems of the prior art are eliminated or reduced by the fishing rod holder of the present invention which provides a simple but reliable mechanism for adequately holding a rod against applied forces while still providing quick, easy and reliable release of the rod when a fisherman decides to resume manual control. In addition, the fishing rod holder of the present invention provides for pivoting movement in two perpendicular directions so that a wide range of adjustment of position is possible.

The fishing rod holder of the present invention includes a pair of spaced apart yokes. The forwardly positioned yoke; i.e., the yoke which is closest to the rod tip; is comprised of a pair of relatively fixed jaws. The rearward yoke is comprised of a pair of relatively movable jaws. These yokes cooperate to support the handle of a fishing rod. The movable jaws of the rear yoke engage the butt end of the fishing rod, and these jaws are pivotable so that they can be moved inwardly toward each other to grasp the butt end of the fishing rod. The front yoke, which also engages the handle of the fishing rod, is at one end of a pivotable lever, and the other end of the pivotable lever engages and activates the movable jaws of the rear yoke. When a fishing rod is inserted in the two yokes, the weight of the fishing rod bears downward on the forward yoke with the fixed jaws to cause the linkage mechanism to pivot and thereby bring together the movable jaws of the rear yoke to firmly grasp the butt end of the fishing rod handle.

The fishing rod holder of the present invention, in a preferred embodiment, also has a bracket clamp for attaching it to the gunwale of a ship or to any other convenient stationary object. A pair of pivot joints extend from the clamp bracket so that the holder can be moved in two perpendicular directions.

BRIEF DESCRIPTION OF THE DRAWING:

The present invention may be better understood and its numerous advantages will become apparant to those skilled in the art by reference to the accompanying drawing wherein like elements are numbered alike in the several figures and in which:

FIG. 1 depicting in phantom the handle end of the fishing rod positioned in the holder;

Figure 1:
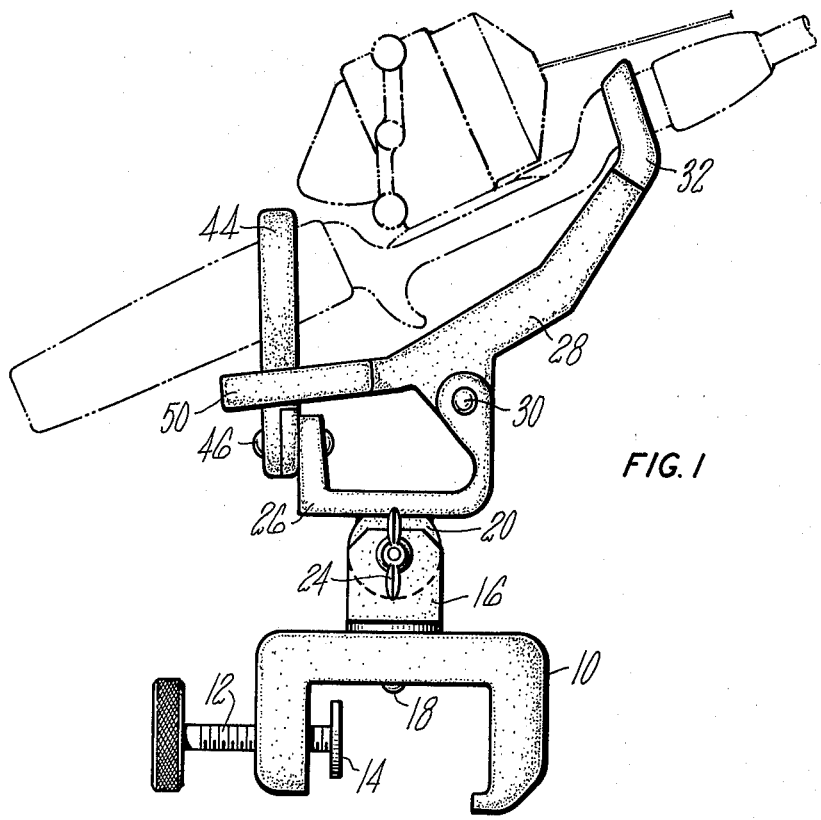
FIG. 1 is a side elevation view of a preferred embodiment of the fishing rod holder of the present invention.
Figure 2:
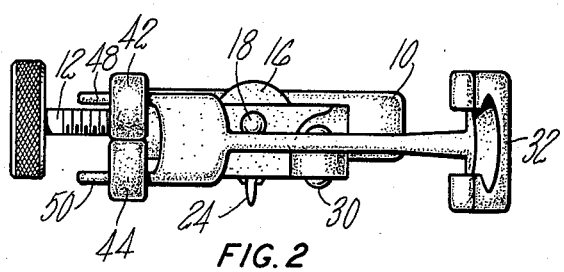
FIG. 2 is a top plan view of the fishing rod holder of FIG. 1.

DESCRIPTION OF THE PREFERRED EMBODIMENT:

Referring now to the drawings, the fishing rod holder has a bracket clamp 10 for attaching the holder to the gunwale of a ship or to any other stationary object. An adjustable threaded rod 12 with a flat head 14 serves to secure the bracket clamp 10 on the supporting object in the well known fashion.

A first L-shaped support lug 16 is pivotally mounted on clamp 10. Lug 16 is pivotally mounted on the clamp by means of a pivot pin 18 whereby the device can be pivoted about a horizontal axis for a first degree of freedom of motion. A second support lug 20 is pivotally connected to support lug 16 by means of pivot pin 22 and wing nut 24. The pivotal mounting of support lug 20 on support lug 16 provides a second degree of freedom of motion whereby the device is pivotable about a horizontal axis. The pivotal mountings of lugs 16 and 20 make it possible to position the rod holder of the present invention in any desired attitude of horizontal and vertical adjustment.

A bracket 26 is either integral with or attached to the top of support lug 20. Bracket 26 serves, in effect, as a support platform for the yoke structure of the fishing rod holder. An elongated link 28 is pivotally connected to one end of bracket 26 via pivot pin 30. Link 28 is thus pivotal about a horizontal axis. A first yoke 32 is integral with or mounted, by any suitable means, at the front or higher end of link 28. Yoke 32 has a pair of stationary jaws 34 and 36 which cooperate to form an arcuate pocket 38 in yoke 32 to receive the forward end of a fishing rod handle.

Figure 3:
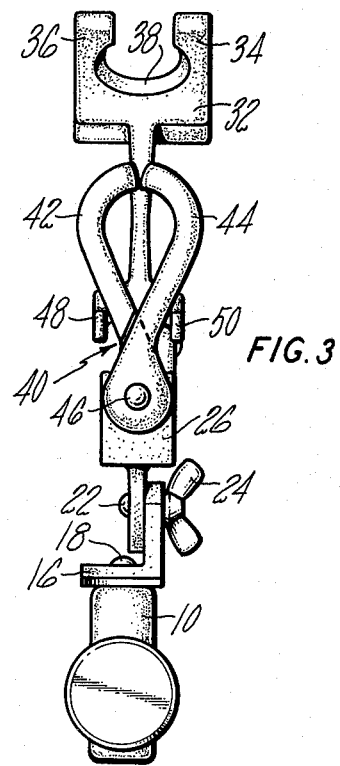
FIG. 3 is a rear elevation view of the holder of FIG. 1.

A second yoke 40 is mounted from the opposite end of bracket 26. Yoke 40 has a pair of curved movable jaws 42 and 44. As may best be seem from FIG. 3, jaws 42 and 44 of yoke 40 are pivotally connected to the rearwardly disposed or lower end of bracket 26 by means of a common pivot pin 46. The movable jaws 42 and 44 serve to grasp the rear or butt end of a fishing rod handle when the fishing rod handle is placed in the holder.

The rear end of link 28 is bifurcated to form a pair of actuator fingers 48 and 50 which extend rearwardly past the exterior of jaws 42 and 44. Clockwise movement of link 28 causes fingers 48 and 50 to move upwardly to thereby cam jaws 42 and 44 together about a rod handle. Conversely, counter-clockwise movement of link 28 causes fingers 48 and 50 to fall away from jaws 42 and 44 whereby jaws 42 and 44 move because of their own weight and balance. The camming action of pivotal jaws 42 and 44 by fingers 48 and 50 of link 28 can best be understood by simultaneous reference to FIGS. 1 and 3 which show jaws 42 and 44 as held in the closed position by fingers 48 and 50.

Prior to the positioning of a fishing rod in the holder of this invention, the weight distribution of link 28 results in it being rotated counterclockwise so that jaws 42 and 44 pivot outwardly from each other to their open position. When a fishing rod is to be positioned in the device, it is placed as shown in FIG. 1. The rear or butt end of the fishing rod is first placed in rear yoke 40 between open jaws 42 and 44, and the front end of the fishing rod handle is then placed in arcuate pocket 38 of front yoke 32. The weight of the fishing rod (the remainder of the fishing rod extending forward of the yoke 32) imposes a load on link 28 whereby 28 is pivoted clockwise. This clockwise movement of link 28 bring fingers 48 and 50 up into engagement with movable jaws 42 and 44 whereby the jaws are brought together to firmly clamp the rear end of the fishing rod. Thus, it can be seen that the fishing rod itself, when properly positioned in the holder, provides the actuating force which results in the fishing rod being firmly gripped and retained in the holder. Furthermore, any additional force which may be imposed on the fishing rod tending to pull it downward, such as the force resulting from a fish being hooked or from the drag of the water, imposes an additional downward force on link 28 which merely serves to reinforce the hold of jaws 42 and 44 on the fishing rod. Thus, these additional loads do not tend to dislodge the fishing rod from the holder as has often been the case in the prior art.

When it is desired to remove the fishing rod from the holder, it is only necessary for the fisherman to grab the fishing rod and lift upwardly. This upward force removes the load on link 28 which previsouly induced the clockwise rotation of link 28. Fingers 48 and 50 are then free to fall away to release jaws 42 and 44; and, in addition, the upward movement of the fishing rod handle will also drive jaws 42 and 44 apart free from the restraints of fingers 48 and 50. Thus, removal of the fishing rod from the holder can be accomplished quickly, easily and reliably, thereby eliminating another problem present in many prior art devices of similar character.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A holder for a fishing rod comprising:
   clamp means, said clamp means being adapted to engage a supporting structure for mounting the holder from such structure;
   a pair of movable jaw members, said movable jaw members being pivotally mounted on said clamp means and cooperating to define a rod receiving opening therebetween, said movable jaw members having an open position whereby a portion of a rod may be inserted therebetween and a closed position wherein a thus inserted rod will be releasably held therebetween;
   rod support means, said rod support means comprising a first pair of fingers which define a first rod receiving recess therebetween, said rod support means further comprising a second pair of fingers which define a second recess therebetween;
   means engaging said rod support means intermediate said first and second pairs of fingers for pivotally mounting said rod support means from said clamp means, said mounting means orienting said rod support means to align said first rod receiving recess with the opening defined by said movable jaw members and to position said second pair of fingers exteriorly of and in engaging relationship with said movable jaw members whereby movement of said rod support means in a first direction causes said second pair of fingers to operate said movable jaw members to the closed position;
   said movable jaw members being weighted to bias said movable jaw members to said open position;
   means for permitting simultaneous adjustment of said rod support means and said movable jaw members about a first axis; and
   means for permitting simultaneous adjustment of said rod support means and said movable jaw members about a second axis transverse to said first axis, said means permitting adjustment about said second axis being adjustable independently of said means permitting adjustment about said first axis.

2. The holder of claim 1 wherein said rod support means comprises:
   a link member having said first and second pairs of fingers respectively extending from opposite ends thereof, said link member having a bend therein whereby said first pair of fingers are disposed vertically above said second pair of fingers and the opening defined by said movable jaw members, the first rod receiving recess defined by said first pair of fingers engaging a portion of a rod forwardly of the rod portion held between said movable jaw members.

3. The holder of claim 1 wherein said rod support means comprises:
   a link member having said first and second pairs of fingers respectively extending from opposite ends thereof, said link member being of nonlinear shape whereby said first pair of fingers are disposed vertically above said second pair of fingers and the opening defined by said movable jaw members, the first rod receiving recess defined by said first pair of fingers engaging a portion of a rod forwardly of the rod portion held between said movable jaw members.

4. The holder of claim 3 wherein said link member is balanced such that it will pivot about said engaging means in a direction which causes said second pair of fingers to move toward the pivot connection of said movable jaw members to said clamp means to thereby permit opening of said moveable jaw members when a rod is not resting in said first rod receiving recess.

5. The holder of claim 1 wherein said movable jaw members each comprises:
   an elongated arm, said arm being pivotally connected to said clamp means adjacent a first end and having an arcuate portion, said arcuate portion extending outwardly with respect to a rod axis defined by said axially aligned opening and first recess from the point of connection to said clamp means and thereafter inwardly to the free end of said arm, a finger of said second pair of fingers of said rod support means being positioned to contact the outwardly extending portion of said arcuate arm portion.

6. The holder of claim 1 wherein said rod support means comprises:

a link member having said first and second pairs of fingers respectively extending from opposite ends thereof, said link member having a bend therein whereby said first pair of fingers are disposed vertically above said second pair of fingers and the opening defined by said movable jaw members, the first rod receiving recess defined by said first pair of fingers engaging a portion of a rod forwardly of the rod portion held between said movable jaw members.

7. The holder of claim 6 wherein said clamp means includes:

means for permitting simultaneous adjustment of said rod support means and said movable jaw members about a first axis; and means for permitting simultaneous adjustment of said rod support means and said movable jaw members about a second axis transverse to said first axis, said means permitting adjustment about said second axis being adjustable independently of said means permitting adjustment about said first axis.

8. The holder of claim 7 wherein said link member is balanced such that it will pivot about said engaging means in a direction which causes said second pair of fingers to move toward the pivot connection of said movable jaw members to said clamp means to thereby permit opening of said movable jaw members when a rod is not resting in said first rod receiving recess.

* * * * *